United States Patent [19]
Krummheuer et al.

[11] Patent Number: 5,554,424
[45] Date of Patent: Sep. 10, 1996

[54] AIRBAG AND FABRIC FOR MANUFACTURING SAME

[75] Inventors: Wolf R. Krummheuer, Wuppertal; Volker Siejak, Duisburg; Hans Graefe, Schwelm, all of Germany

[73] Assignee: Akzo Nobel, N.V., Netherlands

[21] Appl. No.: 428,505

[22] Filed: Apr. 25, 1995

Related U.S. Application Data

[63] Continuation of Ser. No. 210,197, Mar. 18, 1994, abandoned.

[30] Foreign Application Priority Data

Mar. 19, 1993 [DE] Germany .......................... 43 08 871.6
Feb. 12, 1994 [DE] Germany .......................... 44 04 487.9

[51] Int. Cl.$^6$ .................................. B60R 21/16
[52] U.S. Cl. ................ 428/35.2; 428/35.5; 428/36.1; 428/229; 428/257; 428/397; 428/398; 280/728.1; 280/730.1
[58] Field of Search ............................... 428/225, 229, 428/398, 35.2, 35.4, 35.5, 36.1, 257, 258, 259, 397, 373, 376; 280/728 R, 730 R, 728.1, 730.1

[56] References Cited

U.S. PATENT DOCUMENTS

| | | | |
|---|---|---|---|
| 4,298,643 | 11/1981 | Miyagawa et al. | 428/229 |
| 4,548,866 | 10/1985 | Cordova et al. | 428/398 |
| 4,737,401 | 4/1988 | Harpell et al. | 428/229 |
| 4,830,907 | 5/1989 | Sawyer et al. | 428/229 |
| 5,093,163 | 3/1992 | Krummheuer et al. | 428/35.1 |
| 5,178,408 | 1/1993 | Barrenscheen et al. | 280/728 |
| 5,215,795 | 6/1993 | Matsumoto et al. | 428/36.1 |
| 5,236,775 | 8/1993 | Swoboda et al. | 428/225 |
| 5,302,432 | 4/1994 | Shigeta et al. | 428/36.1 |
| 5,356,680 | 10/1994 | Krummheuer | 428/36.1 |

FOREIGN PATENT DOCUMENTS

| | | | |
|---|---|---|---|
| 940693 | 1/1974 | Canada. | |
| 2034067 | 7/1991 | Canada | D06M 11/05 |
| 2061810 | 8/1992 | Canada. | |
| 2066003 | 10/1992 | Canada. | |
| 0509399 | 10/1992 | European Pat. Off.. | |
| 4009611 | 4/1991 | Germany | D03D 1/00 |

*Primary Examiner*—Ellis Robinson
*Assistant Examiner*—Rena L. Dye
*Attorney, Agent, or Firm*—Joseph M. Noto; Louis A. Morris

[57] ABSTRACT

To manufacture airbags comprising a contact fabric and/or a filter fabric it is proposed to use hollow fiber synthetic filament yarns having a hollow area fraction of 10–40%, based on the total cross-sectional area of the fiber. The closeness values are >72% for the contact fabric and 45–68% for the filter fabric. In addition to reducing the production costs, hollow fibers also make it possible to produce lighter fabrics. These have a beneficial effect on the working of an airbag.

5 Claims, No Drawings

AIRBAG AND FABRIC FOR MANUFACTURING SAME

This is a continuation of application Ser. No. 08/210,197 filed Mar. 18, 1994, which is now abandoned.

BACKGROUND OF THE INVENTION

The invention relates to an airbag consisting of at least one contact fabric and/or at least one filter fabric, the contact fabric having an air permeability <10 l/dm²·min and the filter fabric having an air permeability of 20–100 l/dm²·min.

Airbags are usually manufactured from high strength woven fabrics. With these fabrics a specific air permeability is a particularly important requirement. As the airbag inflates, it is necessary that the fabric have a low air permeability to ensure rapid inflation, but upon the vehicle occupant impacting on the airbag some of the gas which has flowed into the airbag has to be able to escape in order that soft cushioning of the vehicle occupant may be ensured. Examples of various low air permeability fabric designs are as described in DE 4,009,611, EP-A 416 483 and EP-A 436 950.

This is why an airbag frequently consists of two parts having different air permeabilities. The part of the airbag against which the incoming gas flows upon inflation and upon which the vehicle occupant impacts as a result of an accident is usually known as the contact part. The part which, upon the vehicle occupant impacting on the airbag, permits a partial escape of the gas in the airbag is known as the filter part. This is because the fabric of the filter part additionally has to ensure that hot particles which have streamed into the airbag together with the generator-produced gas are intercepted, i.e. filtered off. Examples of airbags consisting of two parts are as shown in EP-A 454 213 and EP-A 442 373.

Some airbags are manufactured from contact fabrics only. In such cases openings are introduced into the airbag to allow the gas to escape. In the case of front passenger airbags sometimes only filter fabrics will be employed.

In order that two-part airbags may meet the requirements of rapid inflatability and gas escape facility, the two parts of the airbag have to have different air permeabilities. In the case of the contact part the air permeability should be below 10 l/dm²×min at a test differential pressure of 500 Pa. The filter part is required to have an air permeability between 20 and 100 l/dm²×min at a test differential pressure of 500 Pa, depending on vehicle type. In the airbag fabrics manufactured to date the low air permeability required for the contact part is frequently achieved by coating the fabrics. In addition to the higher production costs, however, coated fabrics have further disadvantages, such as the greater space required to accommodate the airbag in the steering wheel of a vehicle. Recently there have been developed processes which make it possible to manufacture fabrics of low air permeability without an additional coating.

In addition, a fabric for the manufacture of airbags has to meet a number of other requirements. For instance, the fabric has to have a minimum strength level for optimum functioning. Similarly, the fabric should be readily foldable in order that the space required to accommodate the airbag in the steering wheel may be minimized. This also explains the requirement of maximum lightness.

The manufacture of the airbag fabrics also should be inexpensive. Since, owing to the low air permeability required, comparatively closely woven fabrics have to be produced, it is necessary to weave with a high number of warp and filling threads per cm, i.e. with a high closeness value. The number of filling threads has a direct bearing on the production efficiency of the weaving step.

SUMMARY OF THE INVENTION

It is therefore an objective of the present invention to make inexpensive lightweight airbag fabrics without adverse influence on other fabric properties.

It has been surprisingly found that a distinct increase in the weaving efficiency and also a reduction in the fabric weights is possible if, instead of synthetic yarns made of the customarily used solid fibers, there are used synthetic yarns made of filaments which are hollow on the inside. Such fibers are customarily referred to as hollow fibers. For the same cover factor and hence the same air permeability, synthetic filament yarns made of hollow fibers make possible a higher weaving efficiency as a result of the fact that fewer yarns per cm can be used. In addition, for the same degree of cover and the same air permeability the use of hollow fibers makes it possible to produce a lighter fabric which is particularly desirable in airbag fabrics. A further essential advantage of using hollow fibers was found to be that airbags made of hollow fibers reduce the danger to vehicle occupants of injury due to glowing particles.

DETAILED DESCRIPTION

Hollow fiber synthetic filament yarns are known. Similarly, the processes for manufacturing these yarns are known in the man-made fiber industry. Hollow fibers are sometimes used in clothing textiles, less frequently in industrial textiles. Particularly frequent is the use of synthetic hollow fibers where the fiber wall has special semipermeable properties as membranes in separation technology.

Similarly, the use of hollow fibers has been described for technical fabrics. For instance, DE-U 69-38 252 proposes a fabric made of hollow fibers for use as a base fabric for coating material for tarpaulin cloths etc. or as reinforcing fabric in concrete etc. However, the fabric described there is completely unsuitable for airbags, since its closeness value according to the formula of Walz (hereinafter described) at between 15 and 20% is far below the value required for airbag fabrics.

The hollow fibers to be used for airbag fabrics are preferably produced by melt spinning using special spinnerets. These processes are known in the man-made fiber industry. The polymers used are in particular polyester, nylon-6,6, nylon-6, nylon-4,6, polypropylene and polyethylene. But other melt-spinnable polymers are also suitable for producing hollow fibers. The preferred polymers are nylon-6,6, nylon-4,6 and polyester.

The invention shall not be restricted to hollow fibers produced by melt spinning. Synthetic hollow fibers spun by other processes can also be used for manufacturing the airbags and fabrics according to the invention.

Nor shall the invention be restricted to synthetic fiber yarns consisting solely of hollow fibers. The airbags and fabrics of the invention can also comprise mixtures of hollow fibers with normal, non-hollow fibers. The mixing ratio is chosen according to the desired properties. To retain the advantages of the hollow fibers to a sufficient degree, mixtures having a high hollow fiber content are preferred. The sole use of hollow fibers is particularly preferred.

The use of normal, non-hollow fibers can take the form of a mixture of the individual filaments, so that a multifilament yarn contains not only hollow fibers but also normal, non-hollow fibers. Similarly, mixtures can be used in which yarns made of hollow fibers are used in one thread direction and yarns made of non-hollow fibers in the other. In this variant, the use of hollow fiber yarns in the filling is preferred. The mixing can also take the form of alternating use of hollow fiber yarns and in non-hollow fiber yarns the warp or in the filling.

Similarly, the invention shall not be restricted to the use of hollow fibers having the normal, round profile or cross-section. Processes are known in the man-made fiber industry for spinning profile fibers having a hollow interior. These fibers too can be used for manufacturing the fabrics of the invention.

A particularly important requirement for the manufacture of the airbag and fabrics of the invention is that the hollow fibers used should have a hollow area fraction of 10–40%, based on the total cross-sectional area of the fiber.

A hollow area fraction less than 10% is too small a difference from the normal, non-hollow fiber to realize the advantages over normal, non-hollow fibers as regards weaving efficiency and cover. A hollow area fraction above 40% leads to stiffening of the fiber and hence to a deterioration in the foldability of the airbag fabrics. Moreover, fibers having a relatively high hollow area fraction are more difficult to produce consistently. The hollow area fraction is preferably 10–30%, most preferably 15–25%, in each case based on the total cross-sectional area of the fiber.

A further, very significant advantage of using hollow fibers for manufacturing the airbags and fabrics of the invention is the higher thermal insulation, or lower heat transfer coefficient, of the fabrics compared with normal, non-hollow fibers. In the event of deployment of the airbag function it is a frequent occurrence for the generator gas to carry glowing particles into the inflated airbag where they can incipiently melt or burn through individual small areas of the filter part of the airbag, so that escape of the hot particles into the passenger compartment becomes possible. This can cause burns or skin irritation to the vehicle occupant enfolded in the airbag.

This danger can be significantly reduced by using hollow fibers for manufacturing the airbag and fabrics of the invention. The thermal insulation can be characterized in terms of the heat resistance Rh. The heat resistance Rh is defined as follows:

$$R_h = \frac{d}{\lambda \times A}$$

where
d=thickness of fabric
λ=thermal conductivity
A=area of fabric.

For simplicity, the subsequent calculation will always assume a fabric area of 1 m². The values of λ are taken from the technical literature (Dobrinski, P., Krakau, G. and Vogel, A., Physik für Ingenieure, Stuttgart, 1980):
Nylon-6,6: 0.3 W/(m×K)
Polyester: 0.3 W/(m×K)
Air: 0.034 W/(m×K)
where W, m and K are symbols for Watts, meters and degrees Kelvin, respectively.

Assuming for example a basis weight of 210 g/m² or 0.021 g/cm², the following formula gives the thickness of the fabric:

$$d = \frac{B}{D}$$

where
B=mass per unit area
D=density.

A density of 1.14 a/cm³ for nylon-6,6 results in a fabric thickness of $$d = \frac{0.021}{1.14} = 0.018 \text{ cm or } 1.8 \times 10^{-4} \text{ m}.$$

Accordingly, a normal, non-hollow fiber made of nylon-6,6, the above-mentioned basis weight of 210 g/m², the stated density for nylon-6,6, and the calculated thickness of $1.8 \times 10^{-4}$ m result in:

$$R_h = \frac{1.8 \times 10^{-4}}{0.3 \times 1} \frac{K}{W}$$

or $$R_w = 6.0 \times 10^{-4} \frac{K}{W} = 0.0006 \frac{K}{W}.$$

If, by contrast, a hollow fiber with an assumed hollow area fraction of 20%, based on the total cross-sectional area, is used and, again, a basis weight of 210 g/m² is assumed, it is necessary, in calculating the heat resistance, to combine the two parts of the polymer layer and the separating air layer additively. The above-calculated thickness for the polymer layer then results for each individual layer in a thickness of $9 \times 10^{-5}$ m and for the air layer by definition a thickness of $3.6 \times 10^{-5}$ m. Thus:

$$Rh = 3.0 \times 10^{-4} \frac{K}{W} + 10.6 \times 10^{-4} \frac{K}{W} + 3.0 \times 10^{-4} \frac{K}{W}$$
$$= 16.6 \times 10^{-4} \frac{K}{W} = 0.00166 \frac{K}{W}$$

This calculation shows that even a hollow area fraction of 20% results in an increase in the heat resistance by about 175% and that accordingly air bag fabrics made of hollow fibers, compared with fabrics made of non-hollow fibers, are likely at the same basis weight to lead to a distinctly improved thermal insulation and also to a reduced risk of burn through.

The herein-performed calculations, which show a distinct advantage for hollow fiber airbag fabrics over non-hollow fiber airbag fabrics, have indeed been confirmed in inflation tests on airbags made of hollow fibre fabrics. In none of these tests did burn through occur.

The yarns consisting wholly or partly of hollow fibers have a yarn linear density of 200–1,100 dtex. Lower linear densities are problematical with regard to the economics of production, while higher linear densities cannot be used on account of the then much impaired foldability of the airbag fabrics. The filament linear density is preferably below 8 dtex. Higher linear densities can be used, but they impair the foldability of the fabric.

The yarns to be used for manufacturing the fabrics preferably have a tenacity above 60 cN/tex and a breaking extension of 10–30%. The choice of shrinkage data depends on whether the fabric to be manufactured is to be used as a contact fabric or as a filter fabric. For contact fabrics the shrinkage values are 6–10% in the case of polyamide yarns and 6–12% in the case of polyester yarns. Yarns having lower shrinkage values are used for filter fabrics. In this case both polyamide and polyester yarns should have shrinkage values between 2 and 5%. In all cases the shrinkage values referred to were determined at 190° C.

The manufacture of the fabrics for the airbags of the invention can be effectuated on any machine known in the weaving art.

It is important, if the airbag is to function properly, for the contact and filter fabrics to be accurately woven to certain closeness values. The closeness value is an important factor for setting the desired air permeability. The closeness value is determined by the number of yarns used per fabric unit length, i.e. by the thread count. This depends on the yarn linear density, meaning that for the same closeness value a lower thread count is required in the case of a higher yarn linear density as compared with a lower yarn linear density.

The closeness value is frequently expressed, especially outside Europe, in terms of the cover factor, also known as the kappa factor. This factor is simple to calculate by the following formula:

$$K = N_w \times \sqrt{D_w} + N_f \times \sqrt{D_f}$$

where:
K is the cover or kappa factor,
$N_w$ is the number of threads per inch in the warp direction,
$D_w$ is the yarn linear density in denier (den) in the warp direction.
$N_f$ is the number of threads per inch in the filling direction, and
$D_f$ is the yarn linear density in denier (den) in the filling direction.

Fabrics for airbags preferably have a square sett, i.e. the ends and picks per inch are the same or almost the same and the same yarn linear density is used in warp and filling. The need for a square sett results from the demand of automotive manufactures for equal fabric strengths in the warp and filling directions.

The usual square sett of airbag fabrics makes it possible to simplify the above formula to the following form:

$$K = 2 \times N \times \sqrt{D}$$

where:
K is the cover factor,
N is the number of threads per inch in warp and filling, and
D is the yarn linear density in denier (den) in warp and filling.

This cover factor thus constitutes a very simple way of obtaining a measure of the closeness of the fabric. However, this formula does not work so well when comparing fabrics made of different densities of the different raw materials result in noncomparable values. Nor, in general, is it possible to compare the values of fabrics woven in different constructions.

For this reason the figures reported herein for the fabric closeness were calculated by the formula of Walz (Kleinheins S., Textile Prüfungen, Obernburg, 1973), which takes account of the different densities of the raw materials and also includes correction factors for different fabric constructions. This way of calculating the closeness of a fabric as well known especially in the German textile industry. The formula reads:

$$\text{closeness value } \% = (d_w + d_f)^2 \times f_w \times f_f$$

where
$d_{w,f}$=diameter of warp or filling yarn in mm
$f_{w,f}$=warp or filling threads per cm.

The yarn diameter is calculated as follows:

$$d_{w,f} = \frac{\sqrt{dtex_{w,f}}}{88.5 \times \sqrt{\text{density in g/cm}^3}}$$

The density is usually set for nylon-6,6 yarns to the average value of 1.14 g/cm$^3$ and in the case of polyester yarns to the average value of 1.38 g/cm$^3$.

In the case of constructions other than plain weave, it is necessary to include a construction correction factor in the calculation. This factor is for example 0.56 in the case of the 2:2 Panama weaves and 3:1 twill weaves occurring in airbag fabrics. This correction factor is used to multiply the closeness value calculated using the formula of Walz.

The Walz closeness value is reported in %. Very closely woven fabrics can have values above 100%.

To be able to manufacture a usable airbag from synthetic hollow fiber yarns, the closeness values have to be carefully adapted to contact or filter fabrics. For instance, it has been found that contact fabrics have to have a closeness value >72%, preferably >80%, to provide the minimum condition for rapid inflation of an airbag. To obtain good deflation, the filter fabrics must have closeness values between 45 and 68%. These figures apply to the ready-finished fabric as used in the airbag.

The essential factors affecting the closeness value are the numbers of threads per fabric unit length and the linear densities of the yarns used. In the finished fabric the following thread counts/cm have to be maintained at the various linear densities for the manufacture of airbag contact fabrics:

| Yarn linear density | Nylon-6,6 | Polyester |
| --- | --- | --- |
| 235 dtex | 26–31 | 29–34 |
| 470 dtex | 18–24 | 21–25 |
| 640 dtex | 16–20 | 17.5–22 |
| 700 dtex | 15–19 | 16.5–21 |
| 940 dtex | 13–16 | 14.5–17 |

Following are the closeness values in % for the mid-range figures of the above-mentioned thread counts:

| Yarn linear density | Nylon-6,6 | Polyester |
| --- | --- | --- |
| 235 dtex | 85.4 | 86.2 |
| 470 dtex | 92.8 | 92.0 |
| 640 dtex | 92.9 | 92.4 |
| 700 dtex | 90.6 | 91.0 |
| 940 dtex | 88.6 | 86.3 |

Filter fabrics have to have the following thread counts in the finished state:

| Yarn linear density | Nylon-6,6 | Polyester |
| --- | --- | --- |
| 235 dtex | 21–25 | 23–27 |
| 470 dtex | 15–18 | 16–20 |
| 640 dtex | 13–15.5 | 14–17 |
| 700 dtex | 12–14.5 | 13.5–16 |
| 940 dtex | 10.5–12.5 | 11.5–14 |

This results in the following closeness values in %:

| Yarn linear density | Nylon-6,6 | Polyester |
| --- | --- | --- |
| 235 dtex | 46.3–65.7 | 46.0–63.4 |

-continued

| Yarn linear density | Nylon-6,6 | Polyester |
|---|---|---|
| 470 dtex | 47.4–68.2 | 44.5–69.6 |
| 640 dtex | 48.4–68.9 | 46.4–68.4 |
| 700 dtex | 45.2–65.9 | 47.2–66.3 |
| 940 dtex | 46.4–65.8 | 46.0–68.2 |

The figures reported herein apply to finished fabric. The thread counts of the loomstate fabric are lower, since the finishing process will result in a shrinkage process which leads to increased thread counts per fabric unit length. For loomstate fabrics it is possible to assume the following thread counts/cm for the manufacture of airbag fabrics:

| Yarn linear density | Airbag contact Fabric | | Airbag filter fabric | |
|---|---|---|---|---|
| | Polyester | Nylon-6,6 | Polyester | Nylon-6,6 |
| 235 dtex | 27–33 | 24–30 | 22–26 | 20–24 |
| 470 dtex | 19–24 | 16–23 | 15–19 | 14–17 |
| 640 dtex | 16–20 | 14–19 | 13–16 | 12–15 |
| 700 dtex | 15–19 | 13–18 | 12–15 | 11–14 |
| 940 dtex | 13–16 | 12–15 | 10–13 | 9–12 |

The thread counts mentioned here are about 1–3/cm lower than in the case of airbag fabrics manufactured from normal, non-hollow fibers. Conversely, if yarns made of non-hollow fibers and yarns made of hollow fibers are woven to identical thread counts, the hollow fibers will result in an airbag fabric having a basis weight which is lower in proportion with the fraction of the hollow area—a positive effect for use in an airbag.

To remove the spin and fiber finishes from the yarn, it is necessary to subject the fabrics intended for airbags to a washing process. In the case of fabrics woven from polyamide yarns, this wet treatment also brings about distinct shrinkage, which is necessary for further enhancing the closeness of the fabric already closely set on the loom. A suitable method for this was described in EP-A-436 950. This method can be used not only for manufacturing contact fabrics but also for manufacturing filter fabrics. The degree of shrinkage achievable in an aqueous bath depends very much on the original shrinkage values of the yarns used. Since contact fabrics require a higher closeness value than filter fabrics, it is advisable to bring about higher shrinkage in the course of the wet treatment in the case of contact fabrics than in the manufacture of filter fabrics. The above-listed shrinkage values of the yarns to be used reflect this difference.

The fabrics subjected to a wet treatment for the purpose of shrinking them and for removing spin and fiber finishes are subsequently dried, which, in the interests of good aging resistance of the airbag fabrics, a separate drying process is required after the wet treatment. This drying process is described in EP-A-523 546.

Fabrics made of polyester fibers shrink only little in the course of the wash. In fact, shrinkage is in this case initiated in the course of the subsequent hot air treatment. For example, the fabric may be dried at 150° C. and then heat-set at 190° C.

A further aftertreatment process, advantageously following a wash, is a calender treatment of the fabrics. This finishing process is particularly suitable for hollow fiber synthetic filament yarns, since hollow fibers flatten more under the pressure of the calender rolls than normal, non-hollow fibers and thus, compared with corresponding fabrics made of non-hollow fibers, produce better fabric cover, which has a positive effect on the air permeability.

The advantage of hollow fibers over normal, non-hollow fibers is evident from a comparison of the closeness values as will be further demonstrated hereinafter in the Examples. Synthetic filament yarns made of hollow fibers make it possible to use lower thread counts compared with synthetic filament yarns made of non-hollow fibers. Consequently, hollow fiber yarns also produce lower fabric closeness values as shown in the Examples. The airbag of the invention thus has distinct advantages over conventional airbags whose fabrics consist of normal, non-hollow fibers. The hollow fiber airbag fabric which for the same degree of cover and hence also the same air permeability can be made with a lower weight possesses, compared with the conventional heavier fabrics made of normal, non-hollow fibers, better unfoldability and hence in the event of the airbag function being deployed ensures safer cushioning of the vehicle occupant.

The lighter fabric is particularly advantageous in the event of out-of-position accidents, when the driver or front passenger is not in his normal, seated position at the instant of the collision. The momentum transmitted by the airbag to the vehicle occupants in the course of the explosive inflation of the airbag is lessened by a lower fabric mass, which is reflected in softer cushioning of the vehicle occupant in the event of a collision and in a lower risk of injury in the event of out-of-position accidents.

Accordingly, the airbag of the invention offers appreciable advantages in respect of the functioning of the airbag system and particularly in respect of the protection of the vehicle occupants against injuries.

EXAMPLES

Operative Example 1

This example describes the manufacture of an airbag contact fabric from hollow fibers nylon-6,6 yarns. The hollow area fraction was about 18%, based on the total cross-sectional area. A 470 dtex 72 filament yarn was plain-woven into a square sett. The yarn used had a hot air shrinkage value of 8.7% (measured at 190° C.). Ends and picks were both 19/cm. The result is a loomstate closeness of 76.0%. The fabric was subjected to a wet treatment as per the process described in EP 436 950 to release the shrinkage. The closeness increased to 92.8%. The fabric weight was 235 g/m$^2$. The fabric thus produced was found to have an air permeability of 7.6 l/dm$^2$·min at a test differential pressure of 500 Pa.

The air permeabilities reported herein were all determined in accordance with DIN 53 887, except that to obtain a sufficiently strong signal even in the case of fabrics of very low air permeability the test differential pressure was increased to 500 Pa.

Comparative Example 1

The hollow fibers were replaced by nylon-6,6 filament yarns made of normal, non-hollow fibers. The yarn linear density was unchanged. The yarn had a hot air shrinkage value of 8.4%, at 190° C. Again a plain-woven fabric with a square sett was produced. However, in this case the ends and picks were each 21/cm. This results in a closeness value of 92.8%. The further processing of the fabric was as in the operative example. The wet treatment increased the closeness value to 111.3%. The fabric weight was 261 g/m$^2$. The fabric was found to have an air permeability of 6.5 l/dm$^2$·min at a test differential pressure of 500 Pa.

This example shows that hollow fiber yarns give lower fabric weight and approximately the same air permeability at lower thread counts and accordingly allow lighter fabrics to be produced.

Operative Example 2

This example describes the manufacture of an airbag filter fabric from hollow fiber nylon-6,6 yarns. The hollow area fraction was about 29%, based on the total cross-sectional area. A 470 dtex 72 filament yarn was plain-woven into a square sett. The yarn used had a hot air shrinkage of 3.7% (measured at 190° C.). Ends and picks were both 14/cm. The result is a loomstate closeness of 41.3%. The fabric was subjected to a wet treatment as per the process described in EP 523 546. The closeness increased to 47.4%. The fabric weight was 161 g/m². The fabric thus produced was found to have an air permeability of 88 l/dm²·min at a test differential pressure of 500 Pa.

Comparative Example 2

The hollow fibers were replaced by nylon-6,6 filament yarns made of normal, non-hollow fibers. The yarn linear density was unchanged. The yarn had a hot air shrinkage value of 3.4%, at 190° C. Again a plain-woven fabric with a square sett was produced. However, in this case the ends and picks were each 16/cm. This results in a loomstate closeness value of 53.9%. The further processing of the fabric was as in the operative example. The wet treatment increased the closeness value to 60.8%. The fabric weight was 182 g/m². The fabric was found to have an air permeability of 80 l/dm²·min at a test differential pressure of 500 Pa.

This example also shows that hollow fiber yarns give approximately the same air permeability at lower thread counts and accordingly allow lighter fabrics to be produced.

Operative Example 3

This example describes the manufacture of an airbag contact fabric from hollow fiber polyester yarns. The hollow area fraction was about 11%, based on the total cross-sectional area of the fiber. A 640 dtex 140 filament yarn was plain-woven into a square sett. The yarn used had a hot air shrinkage of 8.9% (measured at 190° C.). Ends and picks were both 17.5/cm. The result is a loomstate closeness of 72.5%. The fabric was washed on a jigger at 150° C., then dried on a cylinder drying machine and subsequently heat-set on a stenter at 190° C. This treatment increased the closeness value to 80.2%. The fabric weight was 271 g/m². The fabric thus produced was found to have an air permeability of 9.2 l/dm²·min at a test differential pressure of 500 Pa.

Comparative Example 3

The hollow fibers were replaced by polyester filament yarns made of normal, non-hollow fibers. The yarn density was unchanged. The yarn had a hot air shrinkage value of 8.2%, at 190° C. Again a plain-woven fabric with a square sett was produced. However, in this case the ends and picks were each 19/cm. This results in a loomstate closeness value of 85.5%. The further processing of the fabric was as in the operative example. The wet treatment increased the closeness value to 94.7%. The fabric weight was 293 g/m². The fabric was found to have an air permeability of 9.7 l/dm²·min at a test differential pressure of 500 Pa.

This example too shows that hollow fiber yarns give approximately the same air permeability at lower thread counts and accordingly allow lighter fabrics to be produced.

Operative Example 4

This example describes the manufacture of an airbag filter fabric from hollow fiber polyester yarns. The hollow area fraction was about 19%, based on the total cross-sectional area. A 640 dtex 140 filament yarn was plain-woven into a square sett. The yarn used had a hot air shrinkage of 2.9% (measured at 190° C.). Ends and picks were both 14.5/cm. The result is a loomstate closeness of 49.8%. The fabric was subjected to wet processing and thermosetting as described in operative example 3. This treatment raised the closeness value to 55.4%. The fabric weight was 224 g/m². The fabric thus produced was found to have an air permeability of 68 l/dm²·min at a test differential pressure of 500 Pa.

Comparative Example 4

The hollow fibers were replaced by polyester filament yarns made of normal, non-hollow fibers. The yarn linear density was unchanged. The yarn had a hot air shrinkage value of 3.7%, at 190° C. Again a plain-woven fabric with a square sett was produced. However, in this case the ends and picks were each 16/cm. This results in a closeness value of 60.6%. The further processing of the fabric was as in the operative example. The finishing increased the closeness value to 66.8%. The fabric weight was 247 g/m². The fabric was found to have an air permeability of 61 l/dm²·min at a test differential pressure of 500 Pa.

This example, like the preceding ones, shows that hollow fiber yarns give approximately the same air permeability at lower thread counts and accordingly allow lighter fabrics to be produced.

It is claimed:

1. An airbag having increased heat resistance comprising an uncoated contact fabric, an uncoated filter fabric or a combination thereof, the contact fabric having an air permeability <10 l/dm²min at a test differential pressure of 500 Pa and the filter fabric having an air permeability of 20–100 l/dm²min at a test differential pressure of 500 Pa, the uncoated contact fabric and uncoated filter fabric comprising closely woven synthetic filament yarns which comprise filaments which are hollow on the inside, with a hollow area fraction, based on the total cross-sectional area of the filaments, of 10–40%, said yarns having a linear density of 200–1,100 dtex and a filament linear density of <8 dtex, the uncoated contact fabric having a closeness value >72%, and the uncoated filter fabric having a closeness value of 45–68%, the closeness values calculated according to the following:

$$\text{closesness value } \% = (d_w + d_f)^2 \times f_w \times f_f$$

where $d_{w,f}$=diameter of warp or filling yarn in mm, and $f_{w,f}$=warp or filling threads per cm, for a plain weave and the closeness value as calculated above multiplied by a correction factor for a weave other than a plain weave, wherein said airbag comprising both contact and filter fabrics comprises a filter part, comprising said uncoated filter fabric which filters hot particles from the incoming gas and provides a partial escape of the gas from the airbag, in communication with a contact part, comprising said uncoated contact fabric against which the incoming gas flows and upon which a vehicle occupant impacts as a result of an accident, and wherein said airbag when composed of only said uncoated contact fabric permits a partial escape of the gas upon impact by the occupant.

2. The airbag of claim 1 wherein said hollow area fraction, based on the total cross-sectional area of the filaments, of said synthetic filament yarns comprising filaments which are hollow on the inside is 10–30%.

3. The airbag of claim 1 wherein said hollow area fraction, based on the total cross-sectional area of the filaments, is 15–25%.

4. The airbag of claim 1 wherein the synthetic filament yarns have a tenacity >60 cN/tex and a breaking extension of 10–30%.

5. The airbag of claim 1 wherein the synthetic filament yarns comprise polyester, nylon-6,6, nylon-6, nylon-4,6, polypropylene or polyethylene.

* * * * *